United States Patent [19]

Keller

[11] Patent Number: 4,800,965
[45] Date of Patent: Jan. 31, 1989

[54] DAMPING ELEMENT, AND ITS INSTALLATION IN A MOTOR-DRIVEN HAND TOOL

[75] Inventor: Michael Keller, Nürtingen, Fed. Rep. of Germany

[73] Assignee: Metabowerke GmbH & Co., Fed. Rep. of Germany

[21] Appl. No.: 50,368

[22] Filed: May 18, 1987

Related U.S. Application Data

[62] Division of Ser. No. 713,658, Mar. 19, 1985, Pat. No. 4,667,749.

[30] Foreign Application Priority Data

Mar. 23, 1984 [DE] Fed. Rep. of Germany ....... 3410669
Dec. 20, 1984 [EP] European Pat. Off. ........ 84115934.6

[51] Int. Cl.⁴ .................. B25D 17/00; F16F 13/00
[52] U.S. Cl. ................... 173/162.2; 248/562; 267/140.1
[58] Field of Search ................... 173/162.2; 267/140.1, 267/8 R; 248/562, 634

[56] References Cited

U.S. PATENT DOCUMENTS

| | | | |
|---|---|---|---|
| 3,824,417 | 7/1974 | Moores, Jr. ............... | 173/162.2 |
| 4,469,316 | 9/1984 | Van Den Boom et al. ..... | 267/140.1 |
| 4,478,293 | 10/1984 | Weilenmann et al. ......... | 173/162.2 |
| 4,576,366 | 3/1986 | Gallas et al. ............. | 267/140.1 |

FOREIGN PATENT DOCUMENTS

| | | |
|---|---|---|
| 1752856 | 4/1971 | Fed. Rep. of Germany . |
| 7405791 | 5/1974 | Fed. Rep. of Germany ... 173/162.2 |
| 2460375 | 6/1976 | Fed. Rep. of Germany . |
| 3023544 | 1/1981 | Fed. Rep. of Germany . |
| 3124229 | 3/1982 | Fed. Rep. of Germany . |
| 3124227 | 4/1982 | Fed. Rep. of Germany . |
| 3122979 | 1/1983 | Fed. Rep. of Germany ... 173/162.2 |
| 3140783 | 4/1983 | Fed. Rep. of Germany . |
| 3142673 | 5/1983 | Fed. Rep. of Germany . |
| 210043 | 3/1968 | U.S.S.R. ................ 173/162.2 |
| 1036522 | 8/1983 | U.S.S.R. ................ 173/162.2 |
| 2137132 | 10/1984 | United Kingdom ........ 173/162.2 |

Primary Examiner—Donald R. Schran
Assistant Examiner—Hien H. Phan
Attorney, Agent, or Firm—Jones, Tullar & Cooper

[57] ABSTRACT

A damping element for damping three-dimensional and torsional oscillations, in particular in hand tools, is proposed. The damping element includes an approximately bell-shaped rubber spring element defining a cavity which is filled with a damping fluid. The cavity is closed off at its open end with a rubber diaphragm. Within the cavity there is mounted at least one partition which defines overflow conduits or passages, and additional partitions at an angle to the partition defining the overflow conduits. The partition defining the overflow conduits is rigidly joined to a fastening sleeve situated in the rubber spring at the end thereof opposite to its open end.

12 Claims, 5 Drawing Sheets

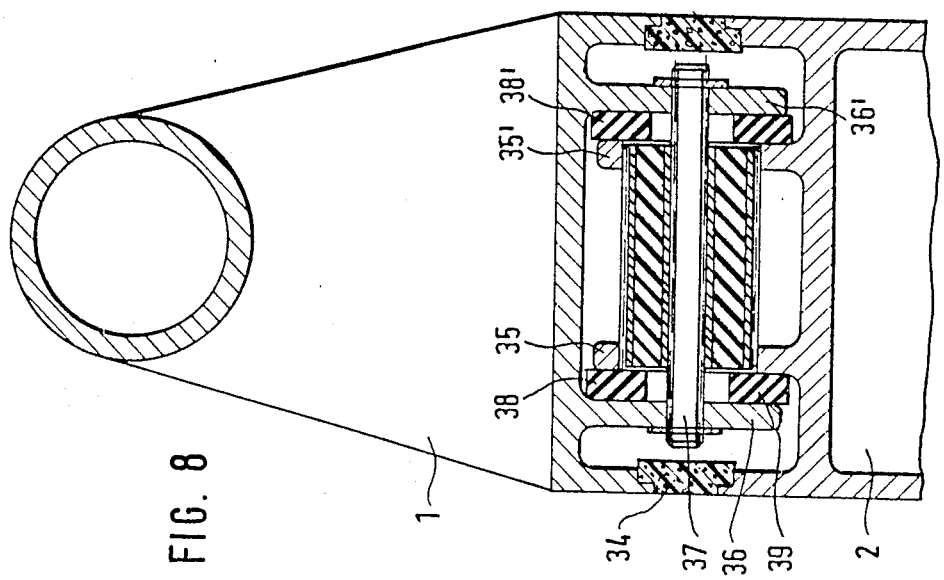
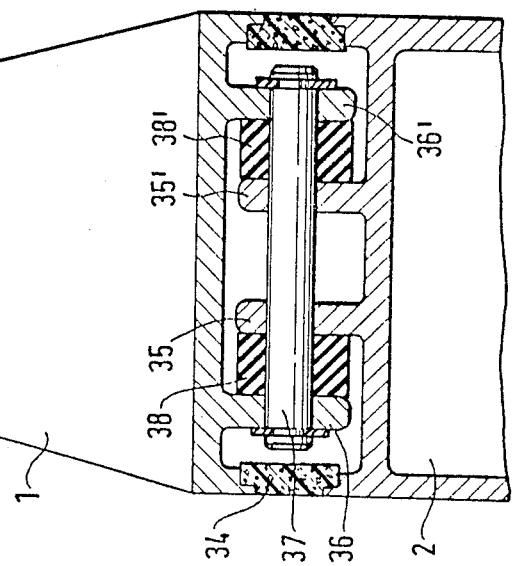

DAMPING ELEMENT, AND ITS INSTALLATION IN A MOTOR-DRIVEN HAND TOOL

CROSS REFERENCE TO RELATED APPLICATION

This application is a division of application, Ser. No. 713,658, which is now U.S. Pat. No. 4,667,749.

TECHNICAL FIELD

The present invention relates to a damping element having a bell-shaped rubber spring element the cavity of which is filled with a damping fluid. A base plate and the portion of the rubber spring element facing the base plate have fastening means, and the cavity filled with damping fluid is subdivided by means of at least one partition, which has overflow conduits and is rigidly joined to one of the fastening means.

PRIOR ART

A damping element of this kind, known from German laid-open patent application DE-OS No. 31 40 783 or DE-OS No. 30 23 544, is capable of satisfactory damping in the desired frequency range by means of the viscosity of the damping fluid, but only of oscillations which arise in the axial direction. If three-dimensional oscillations should occur, however, and in particular if superimposed translational and rotational oscillations are to be damped by the viscosity of the damping fluid, then a plurality of damping elements is required, and these must be built into the equipment in various directions in order to attain satisfactory damping. Damping by means of a rubber spring element itself is not sufficient. Installation becomes substantially more complicated and expensive in this respect, and the structural weight is substantially increased at the same time.

The known damping elements having damping fluid have the advantage that by means of the fluid, even relatively low-frequency oscillations, in the range from a few Hz to 300 Hz, can be damped as well, while pure rubber dampers, oscillations can only be damped satisfactorily above a frequency of approximately 300 Hz.

From German laid-open patent applications DE-OS Nos. 31 22 979, 31 24 227, 31 24 229 and 31 24 330, damping devices having oscillating masses built into tools are described, by means of which specific, particularly disruptive working frequencies permit an optimal damping. The additional weights, however, make construction more complicated and increase the structural weight substantially, which is particularly undesirable in the case of hand tools. The installation of pure rubber spring elements between the hand grip and the actual tool is known from German laid-open patent application DE-OS No. 17 52 856 and German Utility Model No. 74 05 791. As already noted, however, low-frequency oscillations cannot be satisfactorily damped with these damping elements.

From DE-OS No. 30 19 337 and No. 24 60 375, still further damping elements are known; however, they damp optimally only in an axial direction, and so in the case of a three-dimensional oscillation they are capable of satisfactory damping in only one directional component.

OBJECT AND SUMMARY OF THE INVENTION

It is accordingly an object of the present invention to improve a damping element of the generic type discussed above such that three-dimensional oscillations, and in particular superimposed translational and rotational oscillations in the low-frequency range, are damped as well.

In order to attain this object, the invention provides that a partition having overflow conduits is rigidly joined to the fastening means of the rubber spring element, and that additional partitions are provided which extend at an angle to the partition having the overflow conduits. Because of the disposition of the additional partitions, three-dimensional oscillations can be damped by means of the damping fluid. To this end, the partition having the overflow conduits can advantageously extend almost to an approximately cylindrical wall portion of the rubber spring element and thereby form an annular gap which likewise acts as an overflow conduit; this assures sufficient mobility for the partition in terms of a three-dimensional movement. A particularly advantageous feature of the invention is that torsional oscillations about the central axis can be damped particularly well because the additional partitions extend radially to the central axis of the rubber spring element. To this end, the additional partitions then extend suitably at right angles to the partition having the overflow conduits. The magnitude of the damping can be varied by means of the selection of the damping fluid. The embodiment of the free rim contour also has considerable influence. For instance, a particularly pronounced torsional damping is attained by providing that the free rim contour of the additional partition corresponds approximately to the inside contour of the rubber spring element. Additionally, braking faces can be provided on the inside of the rubber spring element, protruding between the additional partitions, so that the braking faces and the additional partitions are disposed such that they mesh practically radially with one another.

A particularly simple feature of the invention in terms of manufacture is that the additional partitions may be embodied as an impeller-like, vaned insert, which is firmly and axially symmetrically joined to the fastening means of the rubber spring element.

A three-dimensional damping is also attainable in that the partition having the overflow conduits is embodied in an arched manner, the arch preferably being open toward the rubber diaphragm. A further increase in three-dimensional damping can be attained by reinforcing the arch with further partitions which extend radially.

For reliably transmitting torsional oscillations about the axis of symmetry, the fastening means nearer the rubber spring element may be a sleeve that extends at right angles to the central axis and can be secured to the corresponding part of the machine by means of a simple bolt or screw.

For firmly anchoring it in the rubber spring element, the insert may be joined to the sleeve via a bolt-like connecting piece fitted tightly and firmly into the rubber spring element.

In order to attain damping which is as neutral to temperature as possible, the damping fluid used may advantageously be an oil, preferably silicon fluid, which is not very dependent on temperature in terms of its viscosity.

From German laid-open patent application DE-OS No. 31 22 979, an electric-motor-driven hand tool in the form of a percussion drilling hammer is known, having a drive mechanism provided in a housing and at least one hand grip, the hand grip being resiliently joined to the housing for the sake of reducing and damping vibration and being braked in its relative movement with respect to the housing by at least one damping element. In this tool, additional masses are used as impact-damping means. This considerably increases the weight of the machine, which is undesirable for handguided motor-driven tools. The known vibration damping is furthermore effective only in the percussion drilling direction. Tests have shown, however, that in many motor-driven hand tools such as jack hammers or drilling hammers, vibrating grinders, right angle grinders, riveting hammers or the like, vibrations and hence hand grip accelerations of the same dimension occur in all three coordinate directions. Since the hand grip accelerations result primarily from the generation and transmission of impacts, as well as from rotational movements, a multidimensional damping is highly advantageous. The use of rubber elements for damping vibrations at frequencies above approximately 200 Hz is known. Since low-frequency vibrations are a greater health threat to the human hand and arm system, however, these vibration components must be damped as much as possible. In order to attain effective vibration damping, the inherent frequency of the damping system must be below the exciter or vibration-arousing frequency by at least a factor of 2. For example, for electropneumatic drilling hammers, impact frequencies of about 3000 per minute are usual, resulting in exciter frequencies of about 50 Hz. To attain good damping, the resonant frequency of the damping system should accordingly be below 35 Hz.

It is a further object of the present invention to damp motor-driven hand tools optimally, at the lowest possible cost in terms of structural weight, for the particularly disruptive low frequencies. To attain this object, the invention provides that a least one damping element of the above-described type is used to reduce vibration and damp oscillation, being disposed between the hand grip and the housing.

In a hand tool for a tool that can be driven forward in the direction of an impact axis, the central axis of the damping element and the impact axis suitably extend at least parallel to one another and preferably are disposed in alignment, in order to attain an operation that is protected as much as possible from oscillation. In a hand tool in which the hand grip is joined to the housing at at least two and preferably three points, the connection located in alignment with the impact axis can be effected by the damping element, the further resilient connections then being provided spaced apart therefrom and allowing at least a swinging movement back and forth between the hand grip and the housing, cushioned by rubber elements, about the impact axis, so that torsional oscillations which may arise are also damped optimally, without increasing the weight of the tool considerably.

To this end, a simple coupling can be effected by providing the hand grip and the housing each with two struts, with the struts of the housing and those of the hand grip furthermore overlapping. The rubber elements are then provided between the struts, and a guide bolt is provided which penetrates the struts and the rubber elements in the direction of the swinging movement. The struts extend approximately at right angles to the rotational oscillation and hence extend radially with respect to the impact axis. In order also to damp axial impacts, the guide bolt can furthermore be additionally retained by two struts of the hand grip or of the housing and be radially resiliently retained with respect to the other two struts of the housing or of the hand grip by means of a further rubber element. This further rubber element can preferably be a sleeve spring, which is particularly easy to install and is not overstressed even when receiving very high loads. The sleeve spring can be radially received in bores of the two inner struts, so that it can be installed by simple insertion; securing it axially becomes unnecessary, if the sleeve spring is positionally secured in the axial direction at its ends via the two rubber elements provided between the struts and via the outer struts.

Further embodiments according to the invention will become apparent from the ensuing detailed description, taken in conjunction with the drawings.

BRIEF DESCRIPTION OF THE DRAWINGS

FIGS. 7 and 8 show two embodiments of the positioning of the hand grip on the housing, in a sectional view taken along the line VII—VII of FIG. 4.

DESCRIPTION OF THE PREFERRED EMBODIMENTS

Figure 1:
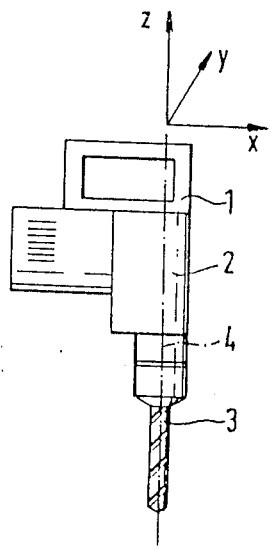
FIG. 1 is a view of a percussion drilling hammer.

In all the following exemplary embodiments, identical reference numerals are used to identify corresponding elements.

The percussion drilling hammer shown in FIG. 1 substantially comprises a hand grip 1, which is joined in a manner described hereinafter to a housing 2 receiving the drive mechanism, and a tool 3, which is rotatable about an impact axis 4 and can be driven forward in the direction of the tool by the drive mechanism. A coordinate system XYZ is also schematically shown, the Z axis being in alignment with the impact axis 4.

Figure 2:
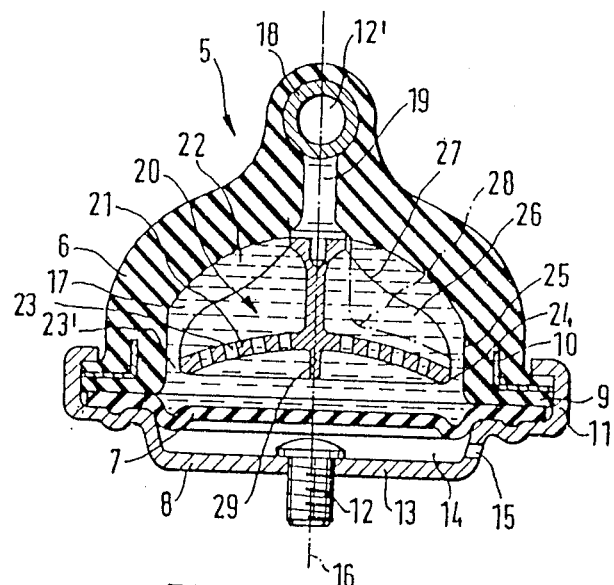
FIG. 2 is a section taken through a rotationally symmetrical damping element.

In FIG. 2, a section through a substantially rotationally symmetrically embodied damping element 5 is shown. This element 5 can be used for damping three-dimensional oscillation. It has a bell-shaped rubber spring element 6, which is closed off at the bottom by means of a rubber diaphragm 7 and a metal base plate 8. For assuring a tight closure, the rim 9 is reinforced with an encompassing metal reinforcement 10, and the rubber diaphragm 7 is joined tightly to the rubber spring element 6 by means of a crimping 11 of the base plate 8.

The base plate 8 bulges out in cup-like fashion, so that an air chamber 14, which communicates with the open atmosphere via a vent hole 15, is formed between the rubber diaphragm 7 and the bottom 13, which carries a fastening means 12. The fastening means 12 is a screw firmly anchored in the bottom 13 and located in alignment with the central axis 16 of the damping element 5.

The cavity 22 formed by the rubber spring element 6 and the rubber diaphragm 7 is filled completely with a damping fluid 17, for instance an oil, preferably silicon fluid, which in terms of its viscosity is not very dependent on temperature.

On the opposite side from the fastening means 12, a further fastening means 12' is provided, in the form of a sleeve 18 firmly anchored in the rubber spring element 6. This sleeve 18 extends at right angles to the central axis 16 and is firmly joined to a connecting piece 19, which extends into the interior of the rubber spring element 6. An impeller-like, vaned insert 20 is carried by the connecting piece 19. The insert 20 has a partition 21 shaped like a spherical cap, which subdivides the cavity 22 filled with damping fluid 17. Overflow conduits, or passages, 23 are provided in a distributed manner in the partition 21, and the encompassing rim 24 of the partition 21 does not rest on a cylindrically embodied portion 25 of the rubber element 6 but instead once again leaves an annular overflow conduit, or passage, 23' open at this point.

Between the connecting piece 19 and the partition 21, additional radially extending partitions 26 are also provided. They are disposed in a star pattern with respect to the central axis 16, and their rim 27 nearer the rubber spring element is adapted approximately to the inside contour of the rubber spring element 6.

Furthermore, as suggested by the dot-dash lines in the right half of FIG. 2, braking faces 28 may be provided, protruding inward from the rubber spring element 6; in the unloaded state, they protrude centrally to in between the additional partitions 26.

Finally, radially extending further partitions 29 may also be provided on the underside of the partition 21, but they do not, however, protrude downward beyond the rim 24.

The function of the damping element is as follows:

When there is an alternating load in the direction of the central axis 16, the damping fluid 17 flows through the overflow conduits 23 and 23', counter to the direction in which force is being exerted, and thus damps the movement in the Z direction or the direction opposite thereto. In particular at high frequency, a further damping is attained by means of the material comprising the rubber spring element 6. This applies particularly to frequencies above approximately 200 Hz. A further adaptation of the damping to the excitation frequency and the coupled masses can be effected within wide limits by the appropriate selection of the material comprising the rubber spring element 6 and of the dimensions, especially of the insert 20. In the event of an axial threshold load in the direction toward the base plate 8, the rubber diaphragm 7 can rest on the bottom 13 of the base plate 8, so that even in the event of large axial loads not usually occurring during normal operation, no damage to the damping element 5 will occur.

This provision also serves to avoid high contact-pressure forces. Under high contact-pressure forces, at the same oscillation excitation there is a higher vibrational load on the human hand and arm system (there is little damping in the layers of tissue). High contact pressure again causes the rubber diaphragm 7 to rest on the base plate 8, thereby hardening the element and thus lessening the comfort with which the tool can be used. Thus the maximum of comfort in use is attained at low pressure forces, which represent the least danger to the hand and arm system.

In a torsional oscillation about the Z axis of the fastening means 12' with respect to the fastening means 12, a torsional oscillation damping is effected via the insert 20, in particular by means of the additional partitions 26. To tune the damping, further overflow conduits may optionally be disposed in the additional partitions 26 and the further partitions 29.

Figure 3:
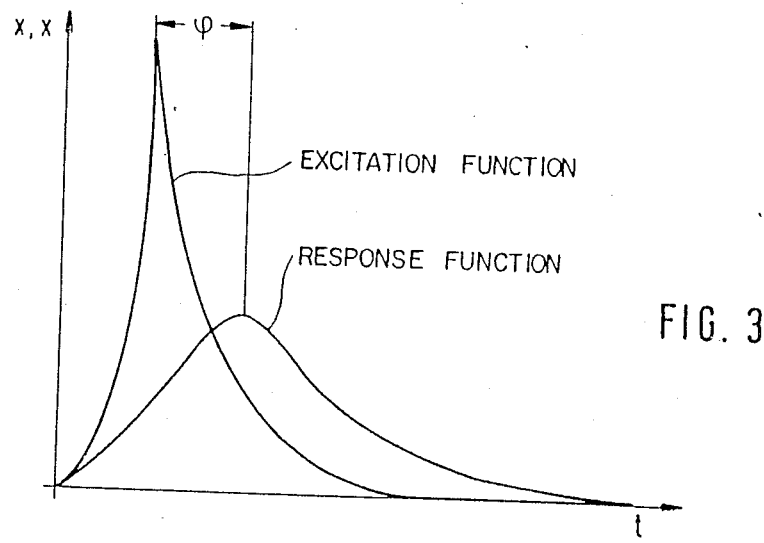
FIG. 3 is a diagram illustrating the excitation function and the response function in a damped system.

Especially in percussive hand-guided machines and equipment, shocklike and pulselike oscillation is predominantly generated. By using damping elements 5, there is an attenuation and a phase shift of the maximum amplitude or acceleration of the response function with respect to the excitation function. This behavior is illustrated in FIG. 3. As a result of the damping that is attained, a reduction in the vibrational load, for instance in hand tools, takes place.

Possible applications of damping elements in an oscillation-damped hand grip system of a percussion drilling hammer are shown in FIGS. 4–8 in various embodiments.

Figure 4:
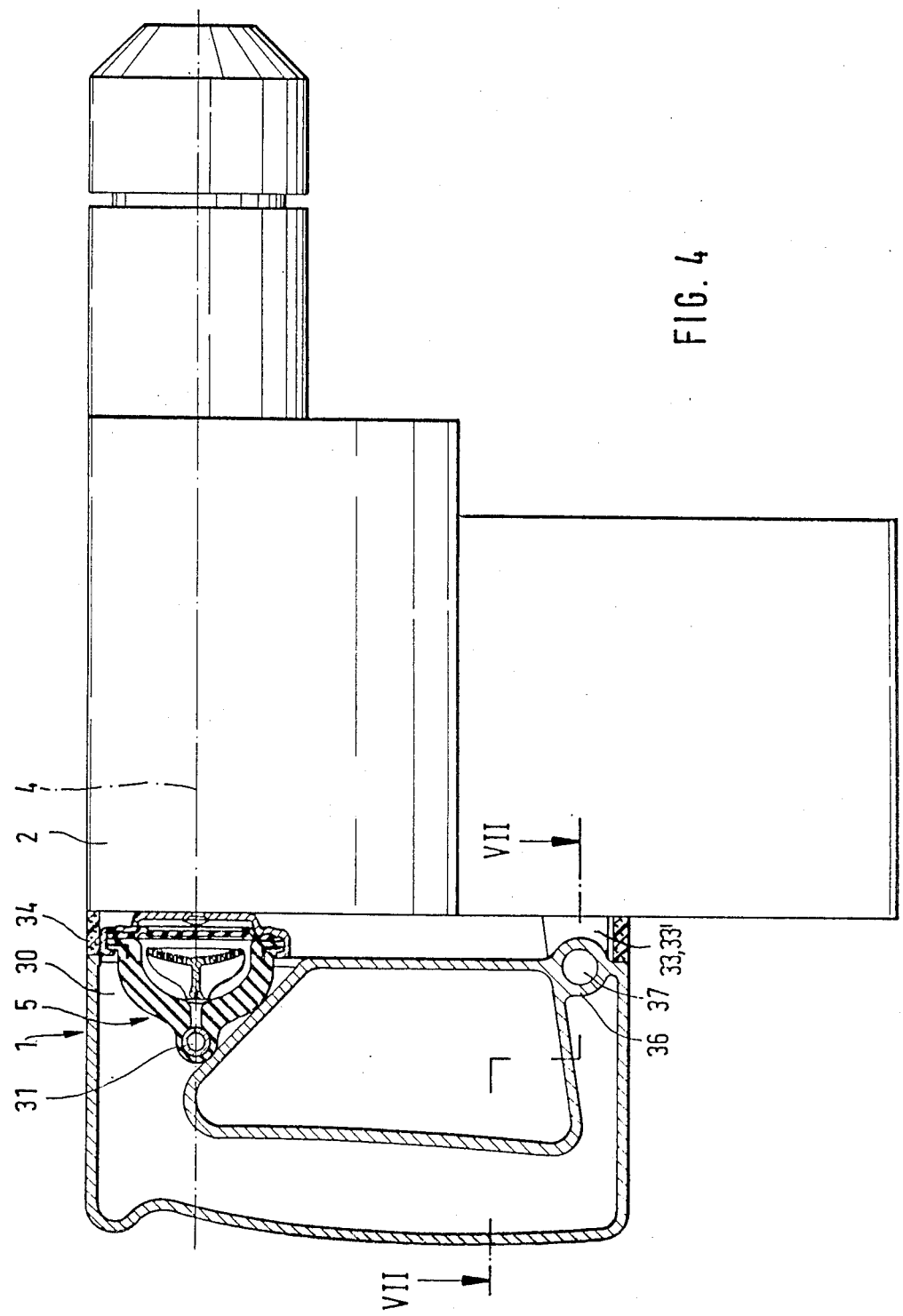
FIG. 4 is a view of a percussion drilling hammer, showing the hand grip area in section.
Figure 6:
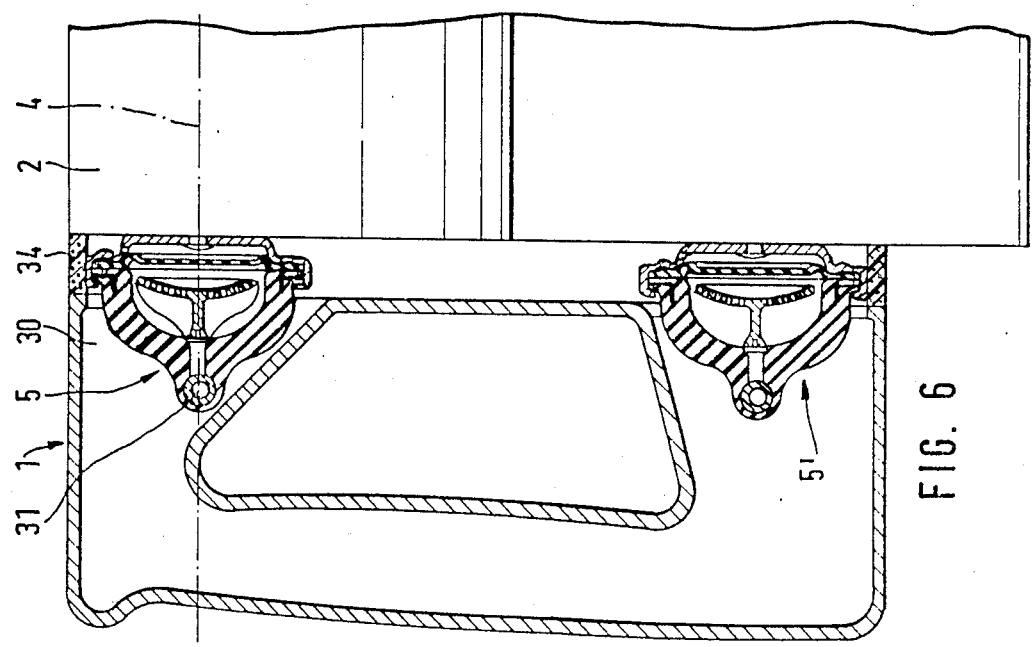
FIGS. 5 and 6 are fragmentary views, corresponding to FIG. 4, of other forms of embodiment of the connection joining the hand grip to the housing.
Figure 5:
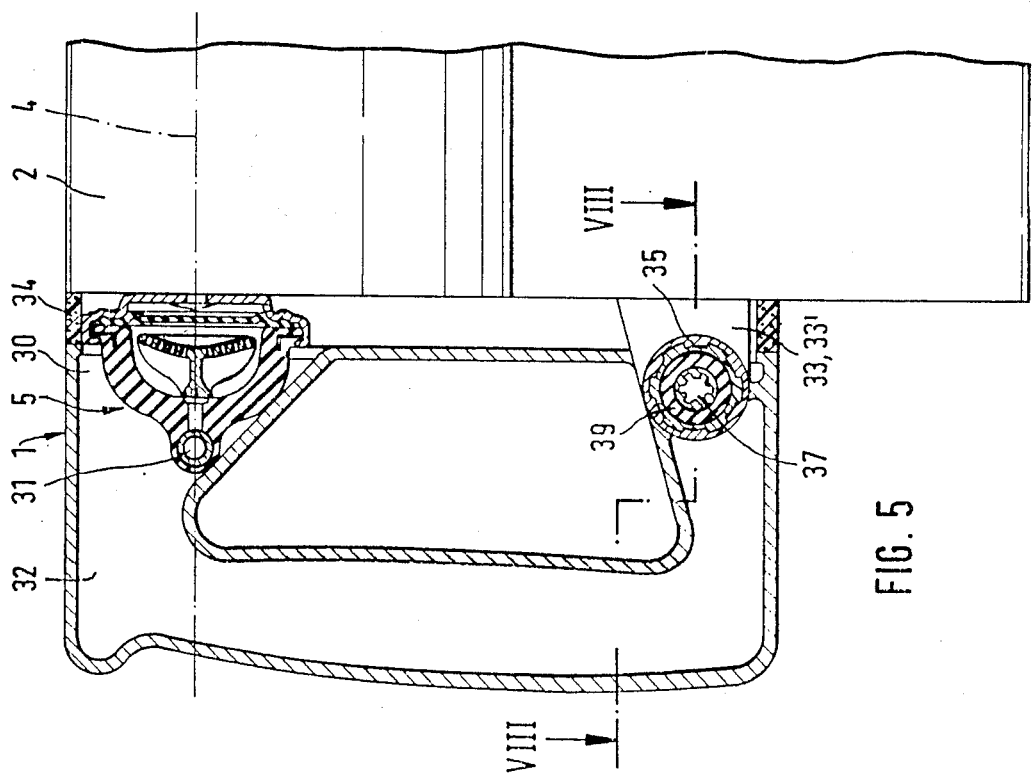

In the exemplary embodiment of FIGS. 4–6, a damping element 5 is disposed in a cavity 30 of the hand grip 1 in alignment with the impact axis 4. The sleeve 18 is firmly anchored between the side walls 32 via a bolt 31, while the base plate 8 of the damping element 5 is firmly connected to the housing 2 via its fastening means 12. The other side of the handle is articulated on struts 33, 33' of the housing 2 (FIGS. 4 and 5). In the embodiment of FIG. 6, the hand grip 1 is coupled to the housing 2 via two damping elements 5, 5'.

For sealing purposes, an elastic sealing element 34, preferably a ring of foamed plastic, is provided between the housing 2 and the hand grip 1. This element 34 is also capable of contributing to oscillation damping and prevents dirt and moisture from entering.

The connection of the hand grip 1 to the housing 2 in the vicinity of the line VII of FIG. 4 is illustrated by a corresponding section in FIG. 7, shown on a larger scale.

Two struts 35, 35' are disposed on the housing 2, protruding toward the hand grip 1. In a corresponding manner, but spaced apart more widely from one another, two struts 36, 36' are also provided on the hand grip 1. All four struts 35, 35', 36, 36' are penetrated by an axially secured guide bolt 37, and a rubber element 38 or 38' in the form of a tube segment is disposed respectively between the struts 35 and 36 and the struts 35' and 36'. The guide bolt 37 is disposed with sufficient play in the struts 35, 35', 36, 36' that a certain oscillation about the impact axis 4 is possible for the hand grip 1; this oscillation is damped and limited by the rubber elements 38, 38'. Particularly low frequencies are absorbed and damped by the damping element 5 disposed in the hand grip 1 in the vicinity of the impact axis 4. In the exemplary embodiment shown in FIG. 7, however, a direct pulse transmission of impacts parallel to the impact axis 4 is effected in the vicinity of the guide bolt 37. These impacts are absorbed and damped, in the exemplary embodiment of FIG. 8, by means of a further rubber element 39 in the form of a sleeve spring, which is disposed on the guide bolt 37 and received by the struts 35, 35' in correspondingly large bores. On the ends, the further rubber element 39 is positionally secured by the rubber elements 38, 38', so that no further axial securing means need be provided. Otherwise the embodiments of FIGS. 7 and 8 are generally identical, so further description is unnecessary.

Figure 9:
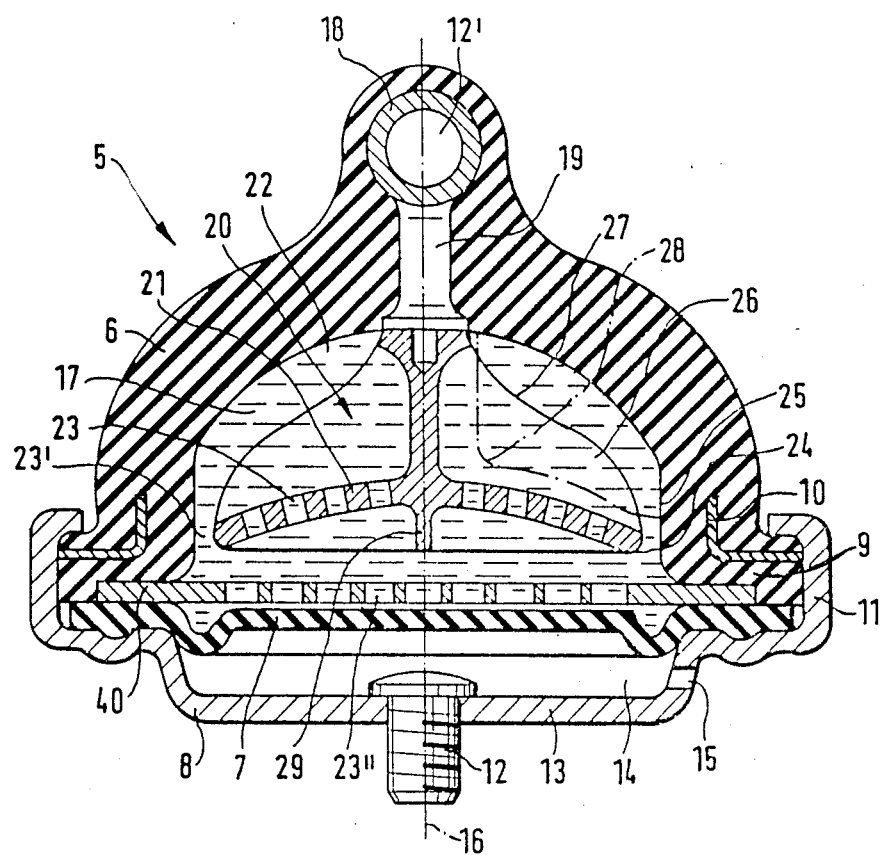
FIG. 9 is a section taken through an exemplary embodiment of a damping element substantially corresponding to the exemplary embodiment shown in FIG. 2.

In the further exemplary embodiment of a damping element shown in FIG. 9, a stroke limiting plate 40 is tightly disposed between the rim 9 of the rubber spring element 6 and the rubber diaphragm, to protect against overstressing of the rubber spring element 6 in the event of strong tensile forces. Overflow conduits 23" are provided distributed on the stroke limiting plate 40, enabling the damping fluid 17 to flow through in a throttled manner, so that an oscillation damping is effected by means of these overflow conduits 23" and additionally by means of the air entering through the vent hole 15. If the rubber diaphragm 7 comes to rest on the stroke limiting plate 40 when there is an axial tug, then the rubber spring element 6 is practically incapable of yielding further in the axial direction and becomes very rigid. An axial overextension of the element is thereby prevented, which could otherwise possibly tear the rim 9 of the rubber spring element 6 out of the crimping 11. It is within the scope of what has been described herein that in the exemplary applications of FIGS. 4–8, a damping element corresponding to FIG. 9 can be used if needed, as a replacement for a longitudinal stop.

What is claimed is:

1. A motor-driven hand tool comprising:
   a housing for housing a drive mechanism;
   a tool connected to one end of the housing, said tool defining an impact axis;
   at least one handgrip joined in a damped resilient manner to the other end of the housing in order to reduce vibration; and
   at least one damping element mounted between the housing and each handgrip serving to reduce vibration and damp oscillations, each damping element defining a control axis parallel to the impact axis, and comprising:
   an approximately bell-shaped rubber spring element having an open end and defining a cavity inwardly from said open end, said cavity being filled with a damping fluid;
   a rubber diaphragm, which extends over said open end;
   a base plate which extends over said open end and is connected to the diaphragm and the spring element such that the diaphragm is pressed tightly against the spring element, a portion of the spring element facing the base plate;
   fastening means mounted to said base plate and to the housing;
   further fastening means mounted to that portion of the spring element facing the base plate and to its respective handgrip;
   at least one partition situated in said cavity connected to said further fastening means, said partition subdividing said cavity and defining overflow conduits therein; and
   a plurality of additional partitions within said cavity which extends at an angle to said at least one partition, wherein:
   two damping elements are mounted between the housing and each handgrip, one of said damping elements being mounted so that the impact axis and the central axis are in alignment, the other of said damping elements being spaced apart and at right angles to said one of said damping elements.

2. A motor-driven hand tool comprising:
   a housing for housing a drive mechanism;
   a tool connected to one end of the housing, said tool defining an impact axis;
   at least one handgrip connected in a damped resilient manner to the other end of the housing at at least two points of connection in order to reduce vibration; and
   at least one damping element mounted between the housing and each handgrip serving to reduce vibration and damp oscillations, each damping element defining a control axis parallel to the impact axis, and comprising:
   an approximately bell-shaped rubber spring element having an open end defining a cavity inwardly from said open end, said cavity being filled with a damping fluid;
   a rubber diaphragm, which extends over said open end;
   a base plate which extends over said open end and is connected to the diaphragm and the spring element such that the diaphragm is pressed tightly against the spring element, a portion of the spring element facing the base plate;
   fastening means mounted to said base plate and to the housing;
   further fastening means mounted to that portion of the spring element facing the base plate and to its respective handgrip;
   at least one partition situated in said cavity connected to said further fastening means, said partition subdividing said cavity and defining overflow conduits therein; and
   a plurality of additional partitions within said cavity which extends at an angle to said at least one partition, wherein:
   said damping element serving to connect the housing at one of said points of connection such that the impact axis and the central axis are in alignment; and
   the other of said points of connection being spaced from said damping element and permitting a swinging movement, cushioned by rubber elements, between the hand grip and the housing about the impact axis.

3. The hand tool as defined in claim 2, wherein:
   the hand grip is connected to the housing at at least three points, with said damping element serving to connect the housing at one point such that the impact axis and the central axis are in alignment.

4. The hand tool as defined in claim 2, wherein:
   the handgrip and the housing each have two struts extending therefrom which overlap when the housing and handgrip are assembled, said struts being aligned such that two innermost struts are defined; and
   said rubber elements are provided between each pair of overlapped struts.

5. The hand tool as defined in claim 4, further comprising:
   a guide bolt, wherein:
   the guide bolt passes through the struts and rubber elements.

6. The hand tool as defined in claim 5, further comprising:
   a further rubber element, wherein:
   the guide bolt is retained by means of two struts of the hand grip or housing and is surrounded by the further rubber element between the struts of the housing.

7. The hand tool as defined in claim 6, wherein:
   the further rubber element comprises a sleeve spring.

8. The hand tool as defined in claim 7, wherein:
   the sleeve spring is radially received in bores of of the two innermost struts.

9. The hand tool as defined in claim 8, wherein:

the sleeve spring is positionally secured in the axial direction at each end by one of said rubber elements.

10. A motor-driven hand tool comprising:

a housing for housing a drive mechanism;

a tool connected to one end of the housing;

at least one handgrip joined in a damped resilient manner to the other end of the housing in order to reduce vibration;

an annular elastic sealing element provided between the housing and each handgrip; and at least one damping element mounted between the housing and each handgrip serving to reduce vibration and damp oscillations, each damping element defining a control axis parallel to the impact axis, and comprising:

an approximately bell-shaped rubber spring element having an open end and defining a cavity inwardly from said open end, said cavity being filled with a damping fluid;

a rubber diaphragm, which extends over said open end;

a base plate which extends over said open end and is connected to the diaphragm and the spring element such that the diaphragm is pressed tightly against the spring element, a portion of the spring element facing the base plate;

fastening means mounted to said base plate to the housing;

further fastening means mounted to that portion of the spring element facing the base plate and to its respective handgrip;

at least one partition situated in said cavity connected to said further fastening means, said partition subdividing said cavity and defining overflow conduits therein; and a plurality of additional partitions within said cavity which extends at an angle to said at least one partition.

11. The hand tool as defined in claim 10, wherein: the elastic sealing element comprises foamed plastic.

12. The hand tool as defined in claim 10, wherein: the elastic sealing element comprises a bellows.

* * * * *